(12) United States Patent
    Yang

(10) Patent No.: US 10,551,702 B1
(45) Date of Patent: Feb. 4, 2020

(54) ARRAY SUBSTRATE, DISPLAY PANEL, AND DISPLAY DEVICE

(71) Applicants: HKC CORPORATION LIMITED, Shenzhen, Guangdong (CN); CHONGQING HKC OPTOELECTRONICS TECHNOLOGY CO., LTD., Chongqing (CN)

(72) Inventor: Yanna Yang, Chongqing (CN)

(73) Assignees: HKC Corporation Limited, Shenzhen, Guangdong (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/312,414

(22) PCT Filed: Nov. 8, 2018

(86) PCT No.: PCT/CN2018/114523
    § 371 (c)(1),
    (2) Date: Dec. 21, 2018

(51) Int. Cl.
    *G02F 1/1362* (2006.01)

(52) U.S. Cl.
    CPC .. *G02F 1/136209* (2013.01); *G02F 1/136286* (2013.01); *G02F 2001/13629* (2013.01)

(58) Field of Classification Search
    None
    See application file for complete search history.

(56) References Cited

U.S. PATENT DOCUMENTS

| | | | | |
|---|---|---|---|---|
| 2010/0231834 | A1* | 9/2010 | Wang | H01L 29/78633 349/110 |
| 2012/0105777 | A1* | 5/2012 | Lee | H01L 27/124 349/106 |
| 2016/0202582 | A1* | 7/2016 | Paek | G02F 1/136209 349/43 |

* cited by examiner

*Primary Examiner* — Phu Vu
(74) *Attorney, Agent, or Firm* — Law Offices of Albert Wai-Kit Chan, PLLC (57) ABSTRACT

An array substrate, including a first substrate, a metal shielding layer, a first black shading layer, and a data line; in which the metal shielding layer includes a first shielding metal lines, and an orthographic projection of the first black shading layer onto the first substrate partially overlaps with orthographic projections of the two first shielding metal lines arranged at the opposite sides of the data line onto the first substrate.

18 Claims, 4 Drawing Sheets

ARRAY SUBSTRATE, DISPLAY PANEL, AND DISPLAY DEVICE

CROSS-REFERENCE TO RELATED APPLICATIONS

This application is the International Application No. PCT/CN2018/114523 for entry into US national phase, with an international filing date of Nov. 8, 2018 designating the U.S., now pending, and claims priority benefits to Chinese Patent Application No. 201821622717.X, filed on Sep. 30, 2018, the contents of which being incorporated herein by reference.

BACKGROUND OF THE INVENTION

Field of the Invention

The present application relates to technical field of a display device, and more particularly to an array substrate, a display panel, and a display device.

Description of Related Art

A display device, such as a mobile phone, a personal digital assistant, a digital camera, a desktop, or a laptop, etc., has been widely used due to the numerous advantages of thin body, power saving, and non-radiative and the like. The existing display device generally has a display panel as a main image display assembly. The display panel is generally formed by a pair of upper and lower substrates, that is, an array substrate and a color film substrate. Polarizing films having polarization directions perpendicular to each other is applied to the array substrate and the color film substrate, in which a shield metal wire, a data line, and a thin film transistor and a pixel electrode arranged in a matrix are formed on the array substrate, and a black matrix, a color resin, and a common electrode are formed on the color film substrate, the black matrix is mainly configured to insulate the color resin (red resin, blue resin, and green resin), and to shield the light of a light leakage area. In the current design, the black matrix is arranged at the color film substrate, and the position thereof corresponds to the shield metal wire, the data line, and the thin film transistor of the array substrate, after the color film substrate and the array substrate are accurately aligned and form a cell, the black matrix can shield the light passing through the shield metal wire and the data wire and emitting in any angles, thereby the light leakage can be effectively prevented.

In the actual production process of the display panel, since the limitation of the equipment accuracy and process conditions, the color film substrate and the array substrate are difficult to be accurately aligned, so that the position of the black matrix is deviated from the design position; in actual use, when the color film substrate or the array substrate is impacted by an external force, the position of the black matrix is also deviated. Both of the above situations may cause light leakage defect generating between the shield metal wire and the data wire, and the yield of the product is seriously affected. In order to solve the light leakage defect, the width of the black matrix is generally increased, but the wider black matrix shields the display area, and the transmittance and display brightness of the display panel are reduced.

BRIEF SUMMARY OF THE INVENTION

An object of the present application is to provide an array substrate, including but not limiting to solve the technical problem of causing light leakage defect generating between the shielding metal line and the data line due to the position of the black matrix deviates from the design position.

Technical Solutions

To solve the above technical problem, the technical solution adopted by the embodiment of the present application is to provide an array substrate, including:

a first substrate;

a metal shielding layer, disposed on a surface of the first substrate;

an insulation layer, disposed onto the metal shielding layer and a surface of the first substrate exposed from the metal shielding layer;

a first black shading layer, disposed at a surface of the insulation layer; and a data line, disposed at a surface of the first black shading layer;

the metal shielding layer includes first shielding metal lines, and opposite sides of the data line are respectively provided with the first shielding metal lines, and an orthographic projection of the first black shading layer onto the first substrate partially overlaps with orthographic projections of the two first shielding metal lines arranged at the opposite sides of the data line onto the first substrate.

In an embodiment, the array substrate further includes:

a passivation layer, disposed at the data line, the first black shading layer exposed from the data line, and a surface of the insulation layer exposed from the first black shading layer;

a first conduction layer, disposed on a surface of the passivation layer.

In an embodiment, an orthographic projection of the first shielding metal lines onto the first substrate partially overlaps with an orthographic projection of the first conduction layer onto the first substrate.

In an embodiment, the metal shielding layer further includes a second shielding metal line, the second shielding metal line is located at a bottom side of the data line, the second shielding metal line is in cross-connection with the first shielding metal lines, and an orthographic projection of the first black shading layer onto the first substrate intersects an orthographic projection of the second shielding metal line onto the first substrate.

In an embodiment, an orthographic projection of the second shielding metal line onto the first substrate partially overlaps with the orthographic projection of the first conduction layer onto the first substrate.

In an embodiment, the array substrate further includes:

a color-resist layer, sandwiched between the passivation layer and the first conduction layer, and the color-resist layer includes a red color-resist block, a green color-resist block and a blue color-resist block.

In an embodiment, the first conduction layer includes a plurality of pixel electrodes, and the red color-resist block, the green color-resist block, and the blue color-resist block are respectively in one-to-one correspondence with the pixel electrodes.

In an embodiment, the array substrate further includes:

a thin film transistor, disposed at the first substrate and electrically connected to the pixel electrodes and the data line.

The array substrate provided by the embodiment of the present application has the beneficial effects that a first black shading layer is arranged between the insulation layer and the data line, and the gap between the orthographic projection of the data line onto the first substrate and the orthographic projection of the shielding metal line onto the first substrate is completely shielded via the first black shading layer; thereby the technical problem of causing light leakage defect generating between the shielding metal line and the data line due to the position of the black matrix deviates from the design position is effectively solved, and the risk of light leakage from the array substrate is reduced, the yield of the display panel is increased.

Another object of the present application is to provide a display panel, including:

a color film substrate; and an array substrate, disposed opposite to the color film substrate and spaced apart from the color film substrate;

the array substrate includes:

a first substrate;

a metal shielding layer, disposed on a surface of the first substrate;

an insulation layer, disposed onto the metal shielding layer and a surface of the first substrate exposed from the metal shielding layer;

a first black shading layer, disposed at a surface of the insulation layer; and a data line, disposed at a surface of the first black shading layer;

the metal shielding layer includes a first shielding metal lines, and opposite sides of the data line are respectively provided with the first shielding metal lines, and an orthographic projection of the first black shading layer onto the first substrate partially overlaps with orthographic projections of the two first shielding metal lines arranged at the opposite sides of the data line onto the first substrate.

In an embodiment, the display panel further includes:

a passivation layer, disposed at the data line, the first black shading layer exposed from the data line, and a surface of the insulation layer exposed from the first black shading layer;

a first conduction layer, disposed on a surface of the passivation layer.

In an embodiment, an orthographic projection of the first shielding metal lines onto the first substrate partially overlaps with the orthographic projection of the first conduction layer onto the first substrate.

In an embodiment, the metal shielding layer further includes a second shielding metal line, the second shielding metal line is located at a bottom side of the data line, the second shielding metal line is in cross-connection with the first shielding metal lines, and an orthographic projection of the first black shading layer onto the first substrate intersects an orthographic projection of the second shielding metal line onto the first substrate.

In an embodiment, an orthographic projection of the second shielding metal line onto the first substrate partially overlaps with an orthographic projection of the first conduction layer onto the first substrate.

In an embodiment, the color film substrate includes:

a second substrate;

a second black shading layer, disposed at a bottom surface of the second substrate, an orthographic projection of the second black shading layer onto the first substrate partially overlaps with the orthographic projection of the first conduction layer onto the first substrate; and a second conduction layer, disposed at the second black shading layer and a bottom surface of the second substrate exposed from the second black shading layer.

In an embodiment, the first black shading layer and the second black shading layer are black photoresist layers made of a carbon black material.

In an embodiment, the display panel further includes:

a liquid crystal, filled at a gap between the first conduction layer and the second conduction layer.

In an embodiment, the first conduction layer and the second conduction layer are respectively a nano-indium tin metal oxide thin film layer.

The display panel provided by the embodiment of the present application has the beneficial effects that the array substrate is adopted, and the gap between the orthographic projection of the data line onto the first substrate and the orthographic projection of the shielding metal line onto the first substrate is completely shielded via the first black shading layer; thereby the technical problem of causing light leakage defect generating between the shielding metal line and the data line due to the position of the black matrix deviates from the design position is effectively solved, and the risk of light leakage from the array substrate is reduced, the yield of the display panel is increased.

A further object of the present application is to provide a display device including:

a display panel; and a backlight assembly, configured to provide illumination for the display panel;

the display panel includes:

a color film substrate; and an array substrate, disposed opposite to the color film substrate and spaced apart from the color film substrate;

the array substrate includes:

a first substrate;

a metal shielding layer, disposed on a surface of the first substrate;

an insulation layer, disposed onto the metal shielding layer and a surface of the first substrate exposed from the metal shielding layer;

a first black shading layer, disposed at a surface of the insulation layer; and a data line, disposed at a surface of the first black shading layer;

the metal shielding layer includes first shielding metal lines, and opposite sides of the data line are respectively provided with the first shielding metal lines, and an orthographic projection of the first black shading layer onto the first substrate partially overlaps with orthographic projections of the two first shielding metal lines arranged at the opposite sides of the data line onto the first substrate.

The display device provided by the embodiment of the present application has the beneficial effects that the display panel is adopted, and the gap between the orthographic projection of the data line onto the first substrate and the orthographic projection of the shielding metal line onto the first substrate is completely shielded via the first black shading layer; thereby the technical problem of causing light leakage defect generating between the shielding metal line and the data line due to the position of the black matrix deviates from the design position is effectively solved, and the risk of light leakage from the array substrate is reduced, the yield of the display panel is increased, and the production cost of the display device is reduced.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

The reference numerals are listed and referred to as follows:

1—display panel; 2—backlight assembly; 10—array substrate; 20—color film substrate; 30—liquid crystal; 11—first substrate; 12—metal shielding layer; 13—insulation layer; 14—first balck shading layer; 15—data line; 16—passivation layer; 17—color-resist; 18—first conduction layer; 21—second substrate; 22—second black shading layer; 23—second insulation layer; 100—thin film transistor; 180—pixel electrode; 121—first shielding metal line; 122—second shielding metal line.

DESCRIPTION OF THE PREFERRED EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

It is noted that when a component is referred to as being "fixed to" or "disposed at" another component, it can be directly or indirectly on another component. When a component is referred to as being "connected to" another component, it can be directly or indirectly connected to another component. Directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application. Terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation.

The specific embodiments of the array substrate, the display panel, and the display device provided by the embodiments of the present application are described in detail below with reference to the accompanying drawings. The size and shape of each area in the drawings do not reflect the true proportions, and the purpose is only to illustrate the content of the present application.

Figure 1:
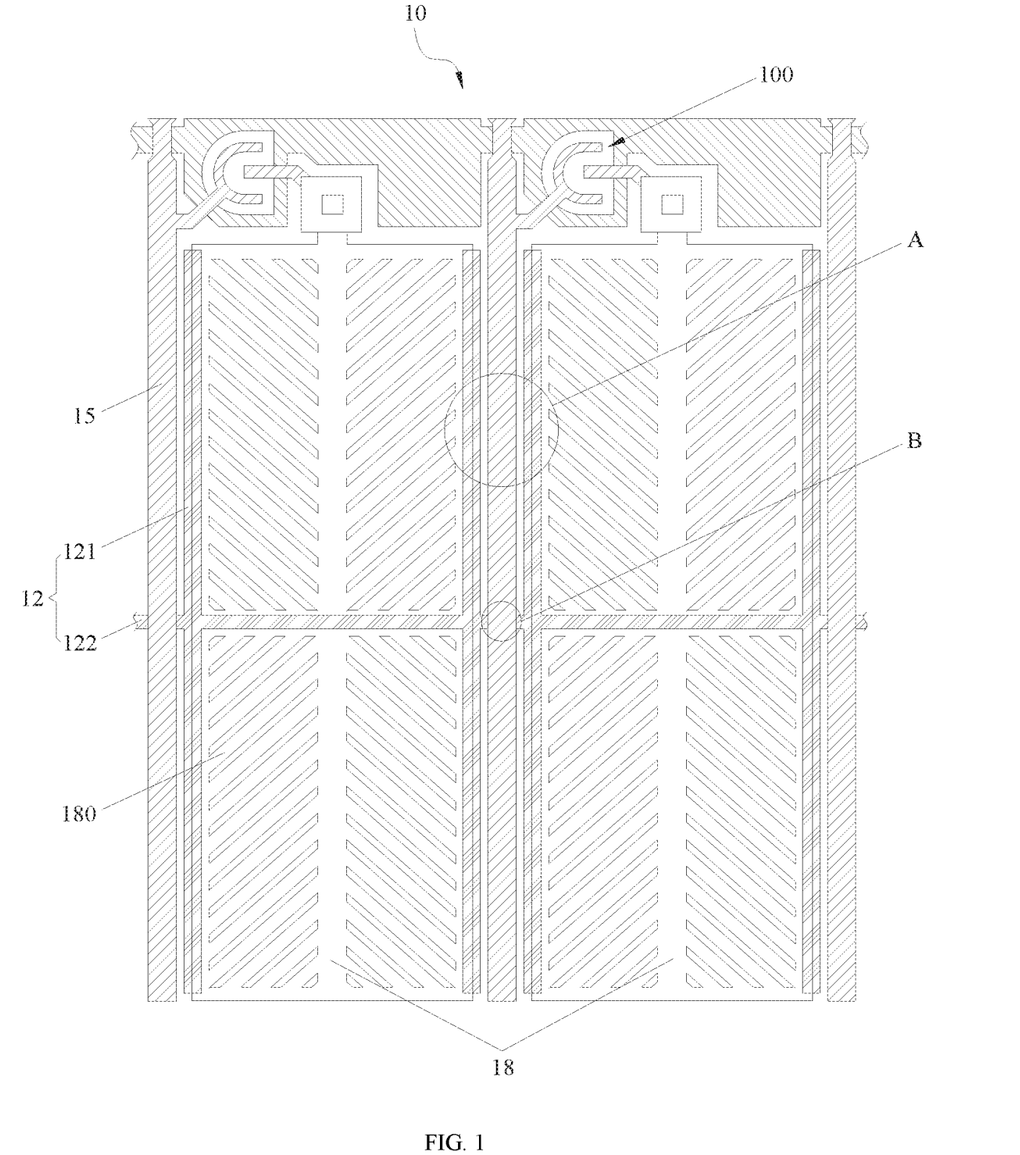
FIG. 1 is a structural schematic view of an array substrate according to an embodiment of the present application.
Figure 2:
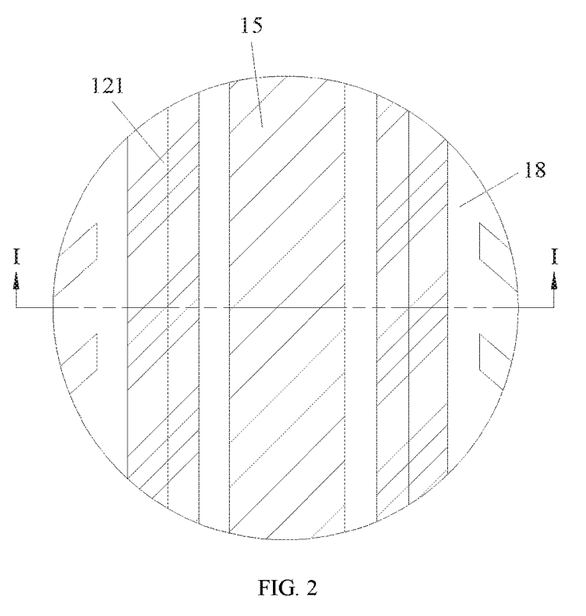
FIG. 2 is an enlarged schematic view of a portion A of FIG. 1.
Figure 3:
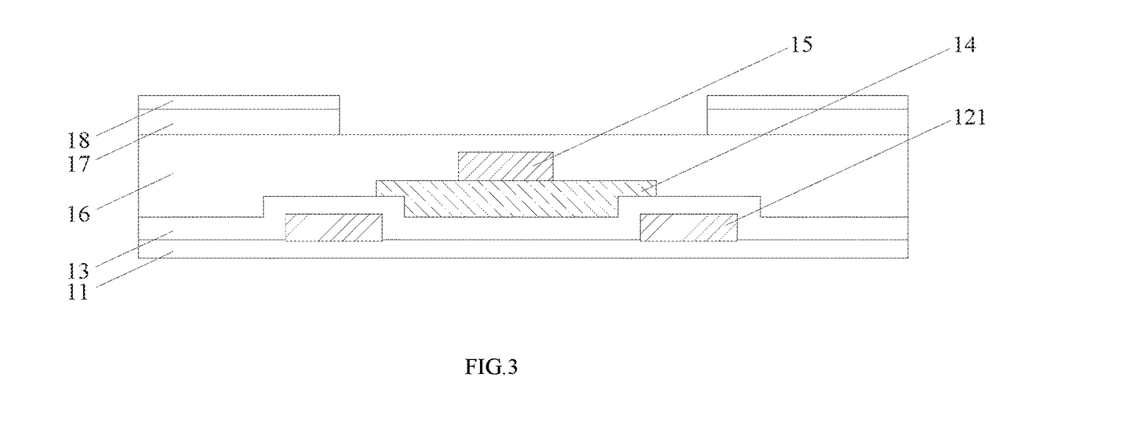
FIG. 3 is a cross-sectional view taken along I-I direction of FIG. 2.

Please refer to FIG. 1 to FIG. 3, an array substrate 10 configured for a display panel 1 includes a first substrate 11, a metal shielding layer 12, an insulation layer 13, a first black shading layer 14, and a data line 15. In which the first substrate 11 is a glass substrate; the metal shielding layer 12 is disposed on a surface of the first substrate 11; the insulation layer 13 is disposed onto the metal shielding layer 12 and a surface of the first substrate 11 exposed from the metal shielding layer 12; the first black shading layer 14 is disposed at a surface of the insulation layer 13; the data line 15 is disposed at the surface of the first black shading layer 14; the metal shielding layer 12 includes first shielding metal lines 121 herein, and opposite sides of each the data line 15 is respectively provided with first shielding metal lines 12. An orthographic projection of the first black shading layer 14 onto the first substrate 11 partially overlaps with an orthographic projection of two first shielding metal lines 121 arranged at the opposite sides of the data line 15 onto the first substrate 11, that is, the first black shading layer 14 extends from a bottom side of the data line 15 to directly above the edge of the first shielding metal lines 121 on the side of the data line 15. It can be understood that there is a gap between the orthographic projection of the data line 15 onto the first substrate 11 and the orthographic projection of the first shielding metal lines 121 onto the first substrate 11, and the first black shading layer 14 shields the gap.

The array substrate 10 provided by the present application that a first black shading layer 4 is arranged between the insulation layer 13 and the data line 15, and the gap between the orthographic projection of the data line 15 onto the first substrate 11 and the orthographic projection of the shielding metal line 121 onto the first substrate 11 is completely shielded via the first black shading layer 14. Thereby the technical problem of causing light leakage defect generating between the shielding metal line 121 and the data line 15 due to the position of the black matrix deviates from the design position is effectively solved, and the risk of light leakage from the array substrate 10 is reduced, the yield of the display panel is increased.

Please refer to FIG. 3, in an embodiment of the array substrate provided by the present application, the array substrate 10 further includes a passivation layer 16 and a first conduction layer 18, in which the passivation layer 16 is disposed at the data line 15, the first black shading layer 14 exposed from the data line 15, and a surface of the insulation layer 13 exposed from the first black shading layer 14; the first conduction layer 18 is disposed on a surface of the passivation layer 16. Specifically, the first conduction layer 18 is configured to form the pixel electrode 180, and the passivation layer 16 is configured to isolate the data line 15 from the first conduction layer 18. Thereby the first conduction layer 18 is effectively prevented from affecting the stability of the signal transmitted by the data line 15 during the conduction process.

Please refer to FIG. 3, in an embodiment of the array substrate provided by the present application, the orthographic projection of the first shielding metal lines 121 onto the first substrate 11 partially overlaps with the orthographic projection of the first conduction layer 18 onto the first substrate 11, that is, one side edge of the first shielding metal lines 121 extends directly below the edge of the first conduction layer 18. Thus, the gap between the orthographic projection of the data line 15 onto the first substrate 11 and the orthographic projection of the first conduction layer 18 onto the first substrate 11 can be shielded by matching the first black shading layer 14 and the first shielding metal lines 121. In this way, the interference between pixels of different colors can be avoided, there is no need to additionally arrange a black shading layer, and the technological process is reduced.

Figure 4:
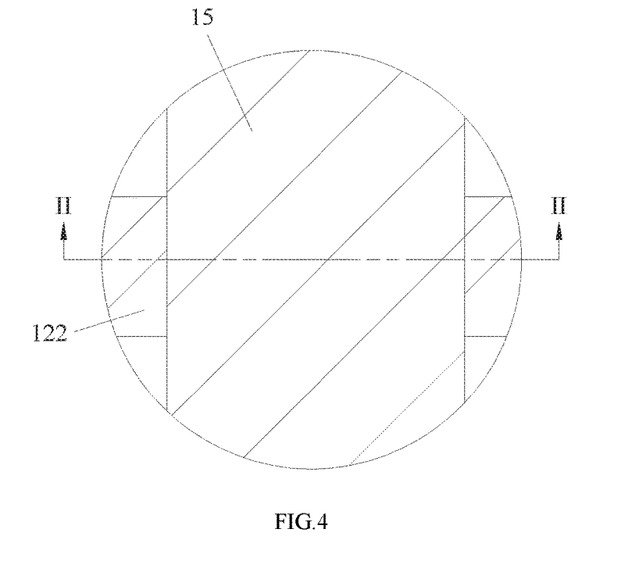
FIG. 4 is an enlarged schematic view of a portion B of FIG. 1.
Figure 5:
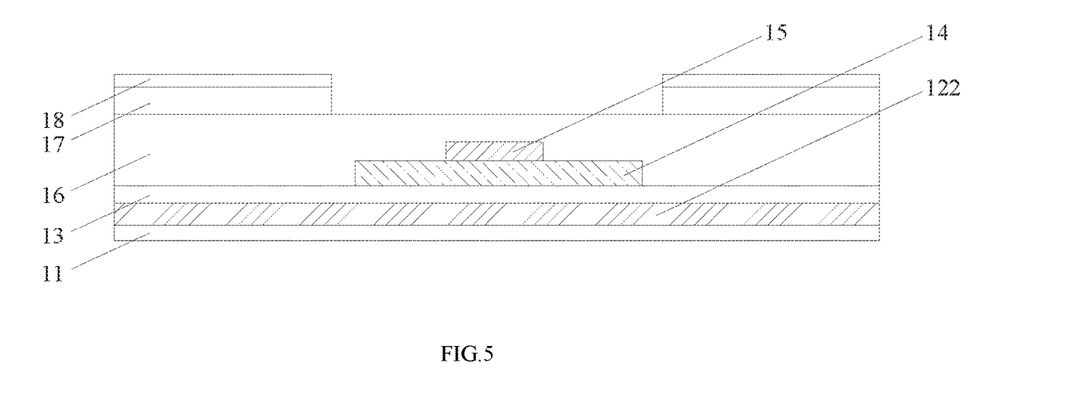
FIG. 5 is a cross-sectional view taken along II-II direction of FIG. 4.

Please refer to FIG. 1, FIG. 4 and FIG. 5, in an embodiment of the array substrate provided by the present application, the metal shielding layer 12 further includes a second shielding metal line 122, and the second shielding metal line 122 is located on a bottom side of the data line 15, and the second shielding metal line 122 is in intersection contact with the first shielding metal lines 121, and the orthographic projection of the first black shading layer 14 onto the first substrate 11 intersects the orthographic projection of the second shielding metal line 122 onto the first substrate 11. Thus, since the first black shading layer 14 is located between the data line 15 and the second shielding metal line 122, the distance between the data line 15 and the second shielding metal line 122 can be increased. Thereby the parasitic capacitance of the overlapping area between the data line 15 and the second shielding metal line 122 is effectively reduced, moreover, abnormality short circuit resulting in a decrease in product yield between the data line 15 and the second shield metal line 122 can be avoided.

Please refer to FIG. 5, in an embodiment of the array substrate provided by the present application, the orthographic projection of the second shielding metal line 122 onto the first substrate 11 partially overlaps with the orthographic projection of the first conduction layer 18 onto the first substrate 11, that is, one side edge of the first shielding metal lines 121 extends directly below the edge of the first conduction layer 18. Thus, the gap between the orthographic projection of the data line 15 onto the first substrate 11 and the orthographic projection of the first conduction layer 18 onto the first substrate 11 can be shielded by matching the first black shading layer 14 and the second shielding metal line 122. In this way, the interference between pixels of different colors can be avoided, there is no need to additionally arrange a black shading layer, and the technological process is reduced.

In an embodiment of the array substrate provided by the present application, the array substrate 10 further includes a color-resist layer 17 sandwiched between the passivation layer 16 and the first conduction layer 18, that is, the color-resist layer 17 is disposed at the surface of the passivation layer 16, the first conduction layer 18 is disposed at the surface of the color-resist layer 17, and the color-resist layer 17 includes a red color-resist block, a green color-resist block, and a blue color-resist block. Specifically, the red color-resist block, the green color-resist block, and the blue color-resist block are arranged in a predetermined sequence, and the first conduction layer 18 includes a plurality of pixel electrodes 180, the red color-resist block, the green color-resist block, and the blue color-resist block are respectively in one-to-one correspondence with the pixel electrodes 180. Thus, by adjusting the voltage level of the pixel electrodes 180, the brightness of the colored light that emit the display panel 1 after passing through the red color-resist block, the green color-resist block, and the blue color-resist block can be adjusted one by one In an embodiment of the array substrate provided by the present application, the array substrate 10 further includes a thin film transistor 100 disposed at the first substrate 11. The thin film transistor 100 is electrically connected to the pixel electrode 180 and the data line 15 to act as a pixel switch, and configured to realize the connection between the pixel electrode 180 and the drive circuit, and between the data line 15 and the drive circuit.

Figure 6:
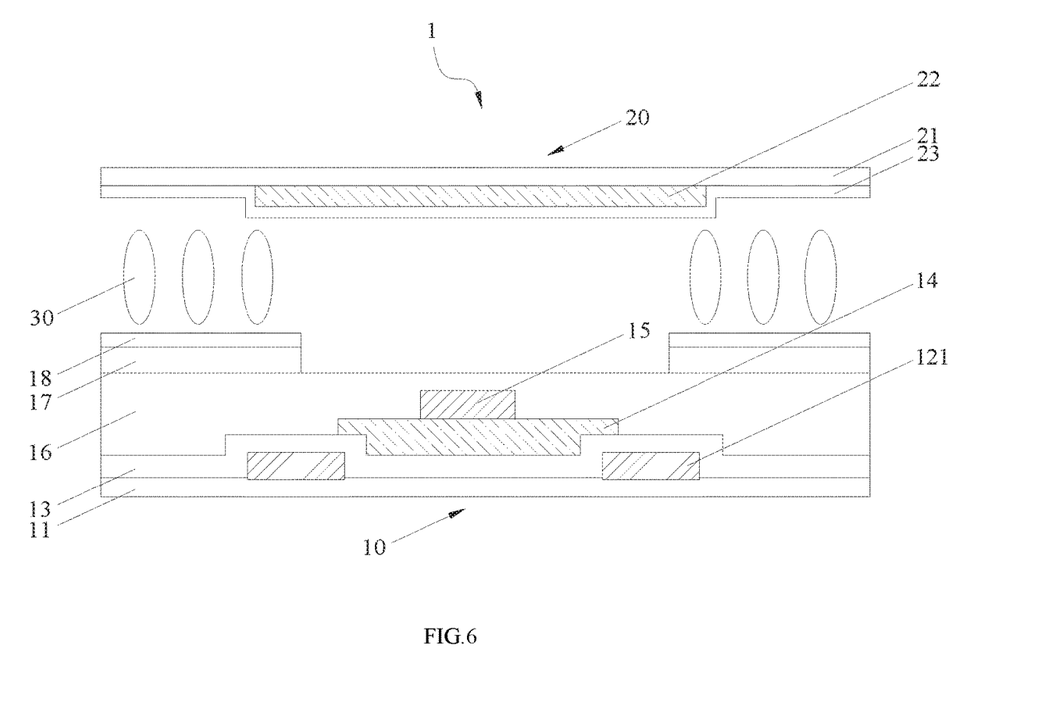
FIG. 6 is a cross-sectional view of the display panel of the I-I direction of FIG. 2.

Please refer to FIG. 6, the present application further provides a display panel 1 including a color film substrate 20 and the above array substrate 10. The array substrate 10 is opposite to and spaced apart from the color film substrate 20.

The display panel 1 provided by the present application adopts the array substrate 10, the gap between the orthographic projection of the data line 15 onto the first substrate 11 and the orthographic projection of the shielding metal line 121 onto the first substrate 11 is completely shielded via the first black shading layer 14. Thereby the technical problem of causing light leakage defect generating between the shielding metal line 121 and the data line 15 due to the position of the black matrix deviates from the design position is effectively solved, and the risk of light leakage from the array substrate 10 is reduced, the yield of the display panel is increased.

Please refer to FIG. 6, in an embodiment of the display panel provided by the present application, the color film substrate 20 includes a second substrate 21, a second black shading layer 22, and a second conduction layer 23. In which the second substrate 21 is a glass substrate; the second black shading layer 22 is disposed at a bottom surface of the second substrate 21, and an orthographic projection of the second black shading layer 22 onto the first substrate 11 partially overlaps with the orthographic projection of the first conduction layer 18 onto the first substrate 11, that is, one side edge of the second black shading layer 22 extends directly above the edge of the first conduction layer 18; the second conduction layer 23 is disposed at the second black shading layer 22 and a bottom surface of the second substrate 21 exposed from the second black shading layer 22, and configured to form a common electrode. Thus, even if the color film substrate 20 and the array substrate 10 cannot be accurately aligned, or the color film substrate 20 and the array substrate 10 are subjected by an external force to cause the relative positions of the two is deviated; there is no light leakage defect generating between the metal shielding layer 12 and the data line 15 by the second black shading layer 22 is matched with the first black shading layer 14; and the yield of the display panel 1 is ensured.

In an embodiment of the display panel provided by the present application, the first black shading layer 14 and the second black shading layer 22 are black photoresist layers made of a carbon black material, which can effectively resist the light from passing.

Please refer to FIG. 6, in an embodiment of the display panel provided by the present application, the display panel 1 further includes a liquid crystal 30 filled in a gap between the first conduction layer 18 and the second conduction layer 23, that is, the liquid crystal 30 is received between the pixel electrode 180 and the common electrode, the orientation of the liquid crystal molecules in the liquid crystal 30 is controlled by applying a voltage to the first conduction layer 18 and the second conduction layer 23, thereby light transmission control is achieved.

In an embodiment of the display panel provided by the present application, the first conduction layer 18 and the second conduction layer 23 may be selected as a thin film of ITO (Indium Tin Oxides), which has transparent properties and good electrical conductivity.

Figure 7:
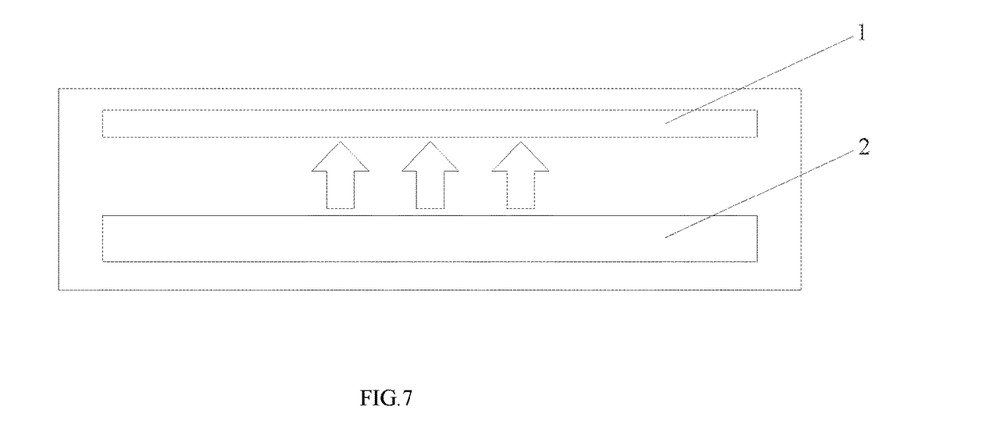
FIG. 7 is a structural schematic view of a display device according to an embodiment of the present application.

The present application further provides a display device including the above display panel 1 and a backlight assembly 2, in which the backlight assembly 2 is configured to provide illumination for the display panel 1.

The display device provided by the present application adopts the display panel 1 that the gap between the orthographic projection of the data line 15 onto the first substrate 11 and the orthographic projection of the shielding metal line 121 onto the first substrate 11 is completely shielded via the first black shading layer 14. Thereby the technical problem of causing light leakage defect generating between the shielding metal line 121 and the data line 15 due to the position of the black matrix deviates from the design position is effectively solved, and the risk of light leakage from the array substrate 10 is reduced, the yield of the display panel is increased, and the production cost of the display device is reduced.

The aforementioned embodiments are only optional embodiments of the present application, and should not be regarded as being limitation to the present application. Any modification, equivalent replacement, improvement, and so on, which are made within the spirit and the principle of the present application, should be included in the protection scope of the present application.

What is claimed is:

1. An array substrate, comprising:
a first substrate;
a metal shielding layer, disposed on a surface of the first substrate;
an insulation layer, disposed onto the metal shielding layer and a surface of the first substrate exposed from the metal shielding layer;
a first black shading layer, disposed at a surface of the insulation layer; and
a data line, disposed at a surface of the first black shading layer;
wherein the metal shielding layer comprises first shielding metal lines, and opposite sides of the data line are respectively provided with the first shielding metal lines, and an orthographic projection of the first black shading layer onto the first substrate partially overlaps with orthographic projections of the two first shielding metal lines arranged at the opposite sides of the data line onto the first substrate.

2. The array substrate of claim 1, wherein the array substrate further comprises:
a passivation layer, disposed at the data line, the first black shading layer exposed from the data line, and a surface of the insulation layer exposed from the first black shading layer; and
a first conduction layer, disposed on a surface of the passivation layer.

3. The array substrate of claim 2, wherein the orthographic projections of the first shielding metal lines onto the first substrate partially overlaps with an orthographic projection of the first conduction layer onto the first substrate.

4. The array substrate of claim 3, wherein the metal shielding layer further comprises a second shielding metal line, the second shielding metal line is located at a bottom side of the data line, the second shielding metal line is in cross-connection with the first shielding metal lines, wherein the orthographic projection of the first black shading layer onto the first substrate intersects an orthographic projection of the second shielding metal line onto the first substrate.

5. The array substrate of claim 4, wherein the orthographic projection of the second shielding metal line onto the first substrate partially overlaps with the orthographic projection of the first conduction layer onto the first substrate.

6. The array substrate of claim 2, wherein the array substrate further comprises:

a color-resist layer, sandwiched between the passivation layer and the first conduction layer, wherein the color-resist layer comprises a red color-resist block, a green color-resist block, and a blue color-resist block.

7. The array substrate of claim 6, wherein the first conduction layer comprises a plurality of pixel electrodes, and the red color-resist block, the green color-resist block, and the blue color-resist block are respectively in one-to-one correspondence with the pixel electrodes.

8. The array substrate of claim 7, wherein the array substrate further comprises:
a thin film transistor, disposed at the first substrate and electrically connected to the pixel electrodes and the data line.

9. A display panel, comprising:
a color film substrate; and
an array substrate, disposed opposite to the color film substrate and spaced apart from the color film substrate;
wherein the array substrate comprises:
a first substrate;
a metal shielding layer, disposed on a surface of the first substrate;
an insulation layer, disposed onto the metal shielding layer and the surface of the first substrate exposed from the metal shielding layer;
a first black shading layer, disposed at a surface of the insulation layer; and
a data line, disposed at a surface of the first black shading layer;
wherein the metal shielding layer comprises first shielding metal lines, and opposite sides of the data line are respectively provided with the first shielding metal lines, and an orthographic projection of the first black shading layer onto the first substrate partially overlaps with orthographic projections of the two first shielding metal lines arranged at the opposite sides of the data line onto the first substrate.

10. The display panel of claim 9, wherein the display panel further comprises:
a passivation layer, disposed at the data line, the first black shading layer exposed from the data line, and a surface of the insulation layer exposed from the first black shading layer; and
a first conduction layer, disposed on a surface of the passivation layer.

11. The display panel of claim 10, wherein the orthographic projection of the first shielding metal lines onto the first substrate partially overlaps with an orthographic projection of the first conduction layer onto the first substrate.

12. The display panel of claim 11, wherein the metal shielding layer further comprises a second shielding metal line, the second shielding metal line is located at a bottom side of the data line, and the second shielding metal line is in cross-connection with the first shielding metal lines, wherein the orthographic projection of the first black shading layer onto the first substrate intersects the orthographic projection of the second shielding metal line onto the first substrate.

13. The display panel of claim 12, wherein an orthographic projection of the second shielding metal line onto the first substrate partially overlaps with the orthographic projection of the first conduction layer onto the first substrate.

14. The display panel of claim 13, wherein the color film substrate comprises:

a second substrate;

a second black shading layer, disposed at a bottom surface of the second substrate, wherein an orthographic projection of the second black shading layer onto the first substrate partially overlaps with the orthographic projection of the first conduction layer onto the first substrate; and a second conduction layer, disposed at the second black shading layer and a bottom surface of the second substrate exposed from the second black shading layer.

15. The display panel of claim 14, wherein the first black shading layer and the second black shading layer are black photoresist layers made of a carbon black material.

16. The display panel of claim 14, wherein the display panel further comprises:

a liquid crystal, filled at a gap between the first conduction layer and the second conduction layer.

17. The display panel of claim 16, wherein the first conduction layer and the second conduction layer are respectively a nano-indium tin metal oxide thin film layer.

18. A display device, comprising:

a display panel; and a backlight assembly, configured to provide illumination for the display panel;

wherein the display panel comprises:

a color film substrate; and an array substrate, disposed opposite to the color film substrate and spaced apart from the color film substrate;

wherein the array substrate comprises:

a first substrate;

a metal shielding layer, disposed on a surface of the first substrate;

an insulation layer, disposed onto the metal shielding layer and the surface of the first substrate exposed from the metal shielding layer;

a first black shading layer, disposed at a surface of the insulation layer; and a data line, disposed at a surface of the first black shading layer;

wherein the metal shielding layer comprises first shielding metal lines, and opposite sides of the data line are respectively provided with the first shielding metal lines, wherein an orthographic projection of the first black shading layer onto the first substrate partially overlaps with orthographic projections of the two first shielding metal lines arranged at the opposite sides of the data line onto the first substrate.

* * * * *